United States Patent [19]

Sandstrom

[11] 4,080,955
[45] Mar. 28, 1978

[54] PORTABLE SOLAR ENERGY COLLECTOR

[76] Inventor: Wayne R. Sandstrom, Box 2414, Fairbanks, Ak. 99707

[21] Appl. No.: 684,771

[22] Filed: May 10, 1976

[51] Int. Cl.² .................................................. F24J 3/02
[52] U.S. Cl. ......................................................... 126/271
[58] Field of Search ................................. 126/270, 271

[56] References Cited

U.S. PATENT DOCUMENTS

| | | | |
|---|---|---|---|
| 3,029,806 | 4/1962 | Okuda | 126/271 |
| 3,145,707 | 8/1964 | Thompson | 126/271 |
| 3,146,774 | 9/1964 | Yellott | 126/271 |
| 3,513,828 | 5/1970 | Masters | 126/271 |
| 3,859,980 | 1/1975 | Crawford | 126/271 |
| 3,918,430 | 11/1975 | Stout et al. | 126/271 |
| 3,943,911 | 3/1976 | Yu | 126/271 |
| 3,952,725 | 4/1976 | Edmondson | 126/271 |
| 3,991,742 | 11/1976 | Gerber | 126/271 |

*Primary Examiner*—Lloyd L. King
*Attorney, Agent, or Firm*—Bacon & Thomas

[57] ABSTRACT

A flat flexible bag of water-impervious material is provided with inlet and outlet tubes extending along the inside of said bag adjacent respectively opposite edges. The bag is divided into transverse compartments, and the inlet and outlet tubes each have openings communicating with each of the compartments.

5 Claims, 5 Drawing Figures

PORTABLE SOLAR ENERGY COLLECTOR

BACKGROUND OF THE INVENTION

This invention is in the field of solar energy collectors.

Solar energy collectors comprising means for holding a film or thin layer of water exposed to the sun's rays have been constructed and wherein the water is circulated through the device and heat extracted from the warmed water. Such devices, however, are conventionally of more or less permanent construction and remain in position where constructed.

SUMMARY OF THE INVENTION

The present invention comprises a solar energy collector in the form of a substantially flat bag having a plurality of compartments through which water is individually circulated for exposure to the sun. The bag is removable from its installed position and when empty can be rolled up for convenient storage and/or easy transportation.

It is, therefore, a principal object of this invention to provide a solar energy collector that is simple and economical in construction and which can be collapsed for storage or transport then reextended for further use.

DESCRIPTION OF A PREFERRED EMBODIMENT

Figure 1:
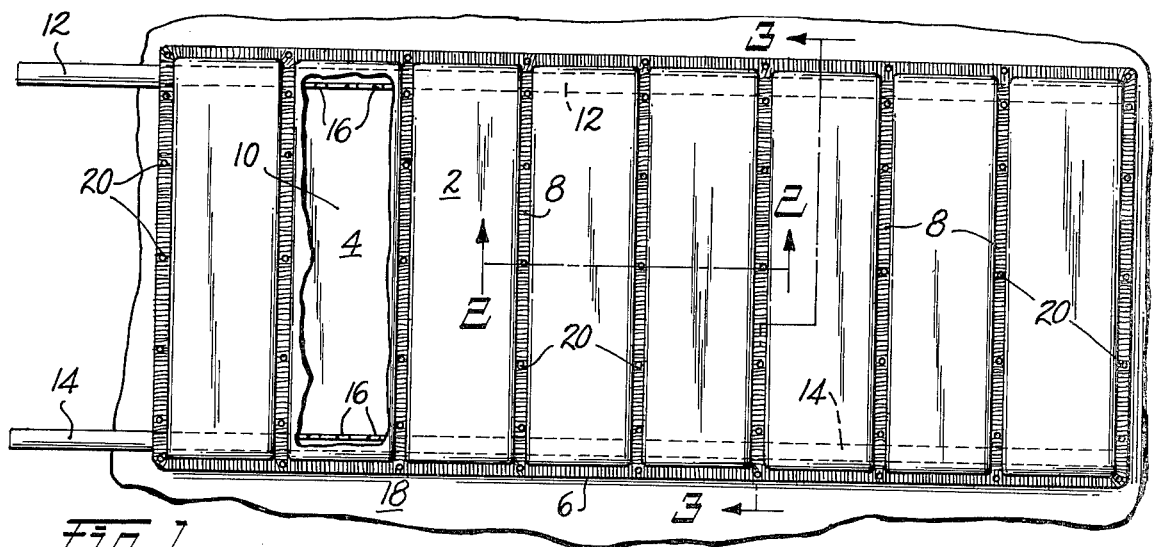
FIG. 1 is a plan view of a solar energy collector constructed in accordance with the present invention.
Figure 3:
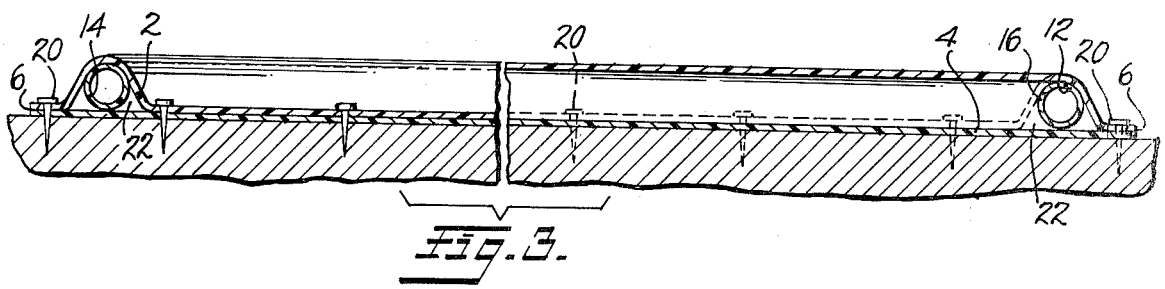
FIG. 3 is an enlarged sectional view taken along the line 3—3 of FIG. 1.

The solar energy collector of the present invention may be of generally rectangular shape as shown in FIG. 1 of the drawings and comprises upper and lower walls 2 and 4, respectively, of a flexible but a water impervious material, preferably pliable plastic sheets. Either or both walls may be transparent or opaque or the upper wall 2 may be transparent while lower wall 4 is opaque, for example, of black color. The upper and lower walls are sealed together around their peripheral edges as indicated at 6 to form a flat watertight bag and are cross sealed along parallel transverse regions 8 to divide the interior thereof into a plurality of transverse compartments 10. An inlet tube 12 and an outlet tube 14 extend through one end edge of the described flat bag and extend therein along respectively opposed edges of the rectangular structure and through each of the compartments 10. Each of the tubes 12 and 14 is provided with a plurality of openings 16 communicating with each of the compartments 10. As shown, the device is secured to a suitable supporting surface 18, such as a roof or the like, by nails or tacks 20 driven through the sealed zones between compartments and through the sealed edge portions of the device. As shown in FIG. 3, the upper wall 2 is folded over the respective tubes 12 and 14. It is not essential that the walls be sealed completely around the peripheries of the tubes 12 and 14 where the latter pass from one compartment to another. In use, when the device is installed in a desired position, water may be caused to circulate through the tube 12 and it will flow through the respective openings 16 into the compartments 10 to form a relatively thin layer of film of water in each compartment. As is known, the water will be heated by the sun's rays and can be withdrawn through tube 14 for use in any desired manner and when cooled by having the heat extracted therefrom, it may be recirculated through the device or may be discharged and fresh water caused to flow into the apparatus. While the bag is divided into compartments, some flow between compartments, around the tubes 12 and 14, does not adversely affect the operation of the device. The described compartments provide for more nearly uniform flow across all parts of the bag.

As will be obvious, the device may be removed from the surface 18 by removing the nails or fasteners 20 and may be then drained of any water remaining therein. Such draining is facilitated by the small spaces 22 shown between the tubes 12 and 14 and the respective walls 2 and 4. When empty, the device may be rolled up into a compact bundle for storage or transport. The tubes 12 and 14 may be either rigid or flexible. If they are rigid, the device, when empty, would be rolled around the tubes to form a bundle the same length as the tubes. However, if the tubes 12 and 14 are of flexible material, the apparatus can be rolled in either direction to form a bundle of the desired dimensions.

Figure 2:
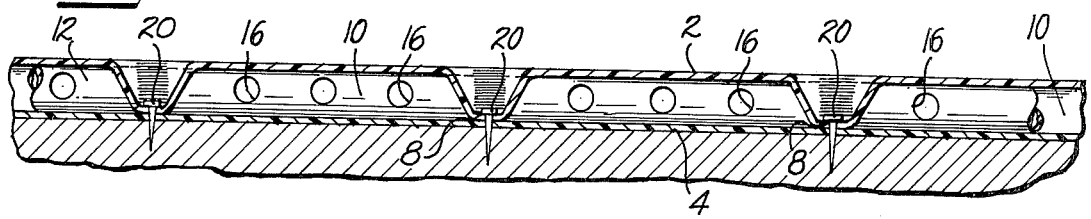
FIG. 2 is a fragmentary enlarged sectional view through the device of FIG. 1 as taken along the line 2—2 of FIG. 1.
Figure 4:
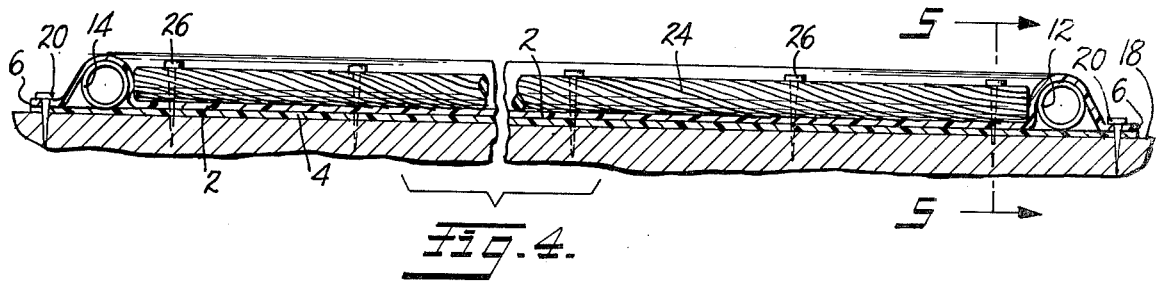
FIG. 4 is a view similar to FIG. 3 but showing a modified form of the invention.
Figure 5:
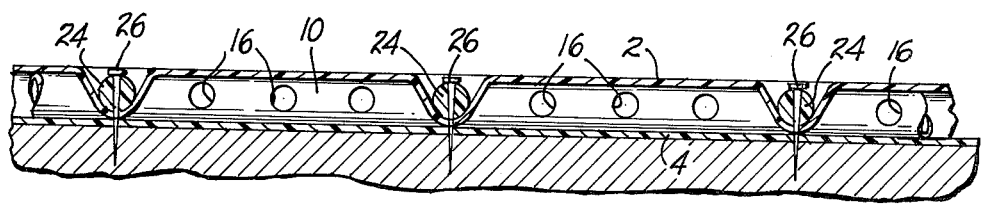
FIG. 5 is a sectional view similar to FIG. 2 but taken along the line 5—5 of FIG. 4.

While FIGS. 1-3 illustrate a device wherein the compartments 10 are formed by permanently sealing the walls 2 and 4 together, at the indicated places, such transverse seals are not essential. The bag may be formed by merely sealing the upper and lower walls around their peripheries, leaving the entire area between the edges unsealed and separate. In such cases, installation of the device would be performed as indicated in FIGS. 4 and 5 wherein the bag is first secured to the supporting surface 18 by the fasteners 20 only around the sealed peripheral edges of the device. Then, lengths of nylon rope or the like 24 are laid across the outer surface of the upper wall and fasteners 26 are driven therethrough, through the walls 2 and 4 and into the supporting surface 18. The members 24 thus effect a division of the interior of the device into individual compartments 10 and operation thereof is exactly as described with reference to FIGS. 1-3. Nylon rope is preferred for the member 24 since it can be made to conform to any unevenness or curvature of the surface 18.

Obviously, the described device need not be secured to a surface such as 18, and can be deployed for use anywhere solar energy is available.

While a limited number of examples of the invention have been shown and described herein, the same are merely illustrative of the principles involved and other forms may be resorted to within the scope of the appended claims.

I claim:
1. A solar energy collector consisting of:
   a generally flat bag of flexible water-impervious material and having opposed walls sealed together at their peripheral edges;
   inlet and outlet tubes extending through one end edge of said bag and extending along opposite edges thereof within said bag;

means dividing the interior of said bag into a plurality of compartments extending thereacross between said inlet and outlet tubes; and openings in the sides of each of said inlet and outlet tubes communicating with each of said compartments.

2. A solar energy collector as defined in claim 1 wherein said bag lies on a supporting surface exposed to solar energy and wherein said means for dividing said bag into compartments comprises members extending across the outer surface of said bag and means clamping said members to said surface with said bag therebetween and securing said bag to said surface.

3. A solar energy collector as defined in claim 2 wherein said members are lengths of flexible rope-like filaments and wherein said last-named means are headed driven fasteners extending through said flexible members and said bag into said surface.

4. A solar energy collector as defined in claim 1 wherein said inlet and outlet tubes are of flexible plastics material.

5. A solar energy collector as defined in claim 1 wherein said means dividing said bag into compartments comprises transverse zones wherein said opposed walls are permanently sealed together.

* * * * *